United States Patent [19]

Newton

[11] Patent Number: 4,800,732

[45] Date of Patent: Jan. 31, 1989

[54] REFRIGERATION COMPRESSOR WITH DUAL VOLTAGE HOOKUP

[75] Inventor: Earl W. Newton, La Crosse, Wis.

[73] Assignee: American Standard Inc., New York, N.Y.

[21] Appl. No.: 187,669

[22] Filed: Apr. 28, 1988

[51] Int. Cl.$^4$ .............................................. F25B 27/00
[52] U.S. Cl. ...................................... 62/236; 62/326; 310/71; 439/926
[58] Field of Search ................. 62/236, 298, 326, 469, 62/508; 439/166, 170, 171, 271, 544, 551, 562, 564, 908, 926; 310/71, 43, 45

[56] References Cited

U.S. PATENT DOCUMENTS

| | | | |
|---|---|---|---|
| 2,174,536 | 10/1939 | Smith | 62/469 X |
| 2,418,729 | 4/1947 | Schemers | 439/271 X |
| 2,579,973 | 12/1951 | Schlosser | 439/926 X |
| 2,702,362 | 2/1955 | Falck | 310/71 X |
| 4,252,394 | 2/1981 | Miller | 439/926 X |

Primary Examiner—Harry B. Tanner
Attorney, Agent, or Firm—William J. Beres; David L. Polsley; Robert J. Harter

[57] ABSTRACT

A compressor driven by a three phase electric motor is contained within a housing that is filled with refrigerant and is hermetically sealed with a terminal board. The terminal board has three electrical feedthrough terminals for coupling three of the motor's six winding leads to a three phase power source. An insulator having a fourth terminal is disposed inside the housing and is attached to one of the feedthrough terminals. In a high voltage application, such as 4160 volts, the fourth terminal provides a convenient location to attach the motor's three remaining leads to a common point. In a low voltage hookup, such as 2400 volts, the fourth terminal is disregarded, and the three remaining leads are separated and paired up with the three leads that are connected to the feedthrough terminals.

33 Claims, 2 Drawing Sheets

REFRIGERATION COMPRESSOR WITH DUAL VOLTAGE HOOKUP

TECHNICAL FIELD

This invention generally pertains to refrigeration compressor motors that are hermetically sealed within a housing that is substantially filled with refrigerant, and more specifically, pertains to the electrical hookup of such motors.

BACKGROUND OF THE INVENTION

Refrigeration systems typically include a condenser, an evaporator, an expansion device, and a compressor driven by an electric motor. The entire system is usually hermetically sealed to prevent refrigerant leakage.

In many cases, the motor has six winding leads that can be connected in different configurations for connection to either a high or low voltage three-phase power source. For a low voltage hookup, the winding leads are grouped into three pairs, and each pair is connected to a different phase of the three-phase power source. In a high voltage application, only three of the six winding leads are directly connected to the power source. The remaining three leads are tied together and mounted at a location where they will not arc to ground nor to any of the other three leads.

Mounting the three common leads to a fourth terminal on the motor's terminal board would be one possible location. Such a location, however, is often impractical if the motor housing is pressurized with refrigerant and the supply voltage is relatively high, such as 1,000 volts or more. The location is impractical under such operating conditions, because the size of terminal board is usually too small to include four terminals.

The terminal board is attached to the motor housing and includes three feedthroughs that couple the motor windings to the three phases of the power source. The terminal board is hermetically sealed to the motor housing and is exposed to atmospheric pressure on one side and higher refrigerant pressure on the other. The size of the terminal board is kept to a minimum to minimize the bursting force exerted against the board. However, high voltages require a substantial amount of space between leads to prevent arcing. As a result of the minimally sized board and the required spacing between leads, there usually is not enough room on the board to mount a fourth terminal for the common leads. Moreover, penetrating the board with an additional terminal may weaken the hermetic integrity of the refrigeration system.

SUMMARY OF THE INVENTION

An object of the invention is to provide a convenient spot to attach the three common leads of a motor having at least six leads.

Another object of the invention is to minimize the number of feedthroughs through a terminal board hermetically sealed to a refrigerant filled motor housing.

Yet another object is to provide the common leads with an accessible mounting location that avoids permanently sealing the common leads within the stator windings.

A feature of the invention is a terminal board that hermetically seals a refrigerant filled motor housing from atmosphere.

Another feature is a terminal board having four terminals but having only three feedthroughs for maximizing the hermetic integrity of a refrigeration system.

The invention has the advantage of providing four terminal locations on a phenolic board that is minimally sized to normally include only three terminals.

Another advantage is that the invention allows a six lead motor to be readily converted between high and low voltage hookups.

The objects, features and advantages of the invention are provided by a refrigerant filled housing for a three phase motor having six leads. The motor is hermetically sealed within the housing by way of a terminal board. The terminal board includes three feedthrough terminals for conducting three phase power to three of the six motor leads. An insulator is attached to one of the feedthrough terminals to provide a spot for attaching the remaining three common leads of the motor.

DESCRIPTION OF THE PREFERRED EMBODIMENT

Figure 1:
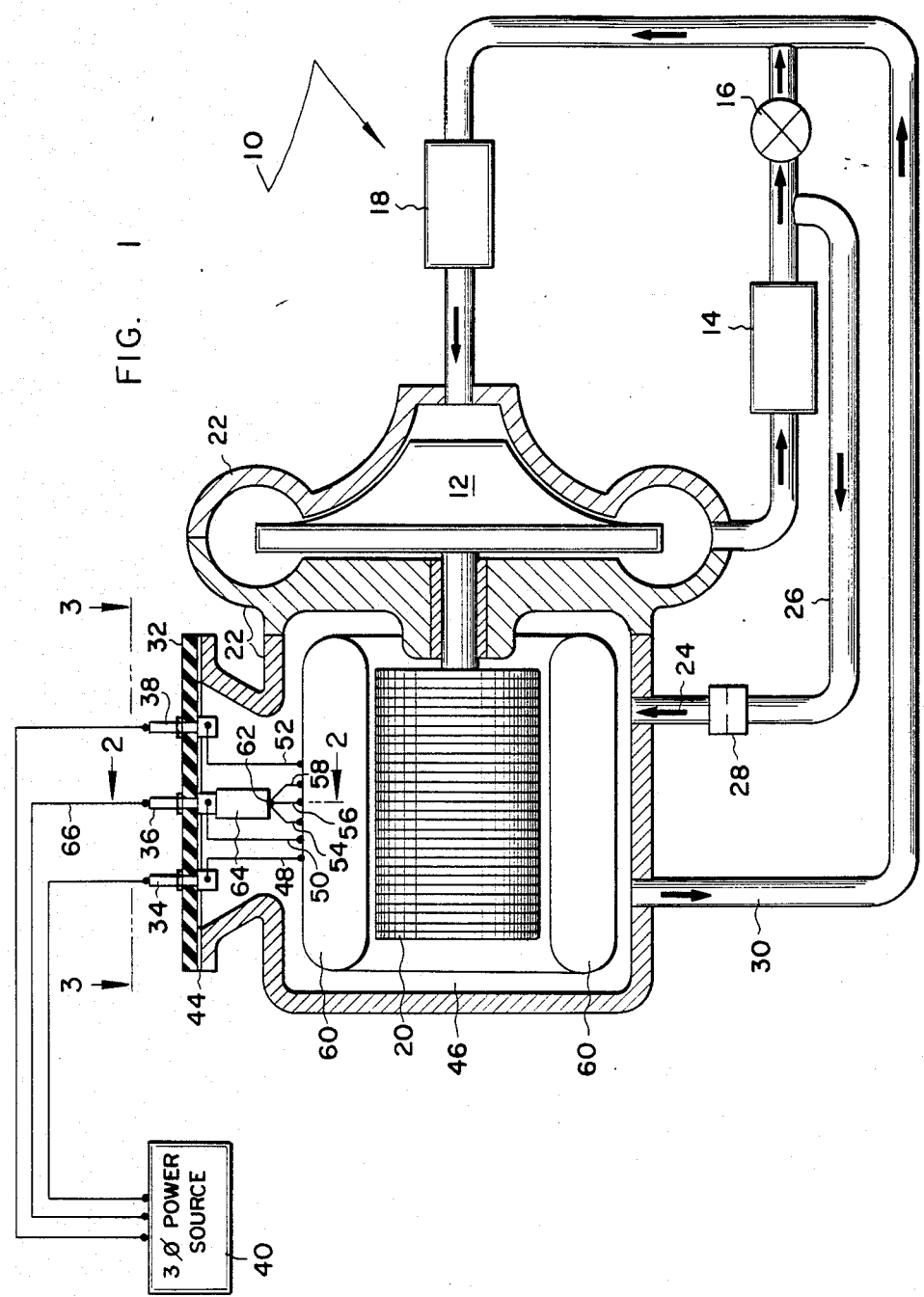
FIG. 1 illustrates a refrigeration system incorporating the subject invention.

The refrigeration system 10 shown in FIG. 1 incorporates the subject invention. As in most refrigeration systems, system 1 includes a compressor 12, a condenser 14, an expansion device 16, and an evaporator 18, connected in series and hermetically sealed. A three phase electric motor 20 drives compressor 12 and both are contained in a common housing 22 that is hermetically sealed. Motor 20 is cooled by a flow of refrigerant 24 supplied via line 26 and an orifice 28. After cooling motor 20, the refrigerant returns to the refrigeration cycle through line 30. It should be appreciated, however, that any refrigeration circuit that conveys refrigerant to the motor is within the scope of this invention. In addition, the term, "refrigerant", represents any fluid that is expanded to provide a cooling effect.

Housing 22 includes a phenolic or some other non-conductive terminal board 32. Three feedthrough terminals 34, 36, and 38 extend through board 32 to conduct current from a three-phase power source 40 to motor 20. Board 32 and its terminals 34, 36, and 38 are hermetically sealed by seals 42 and 44 (FIG. 2) to contain the vaporized refrigerant 46 that substantially fills housing 22. Seals 42 and 44 represent any means for preventing refrigerant leaks, for example; gaskets, O-rings, adhesives, compression fits, etc. In a preferred embodiment of the invention, seal 42 is an O-ring and seal 44 is a gasket.

The terminal board's size (area exposed to the refrigerant) is kept to a minimum to minimize the bursting force developed by the pressure differential across board 32. This is important, since even low pressure differentials can result in a substantial bursting force. For example, if the pressure of refrigerant 46 is 15 psig, and the board dimensions of the portion exposed to refrigerant 46 is 10 inches by 24 inches, the bursting force (pressure differential times exposed area) will be 3,600 pounds.

The three phase motor 20 has at least six motor winding leads 48, 50, 52, 54, 56, and 58 that are connected as shown in FIG. 1. Leads 48, 50, and 52 are connected to feedthrough terminals 34, 36, and 38 to deliver the three phase high voltage Power (greater than 3,000 volts) to the motor's stator windings 60. The remaining three leads 54, 56, and 58 are connected together at a fourth terminal 62. Terminal 62 is attached to a phenolic or some other non-conductive insulator 64 which extends from one of the other terminals, such as terminal 36.

Figure 2:
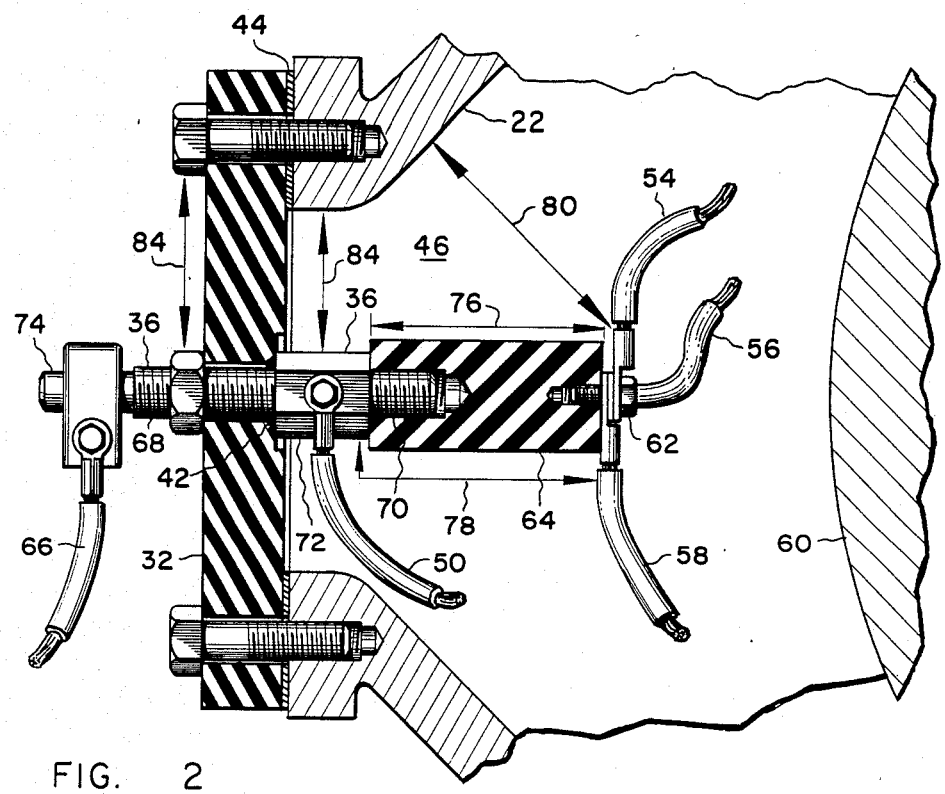
FIG. 2 shows a cross-sectional view of a terminal board and one feedthrough terminal with an attached insulator.

Details of insulator 64 and the feedthrough terminal 36, to which it is mounted, are shown in FIG. 2. Feedthrough terminal 36 represents any electrical conductor that can conduct current from power line 66 to lead 50 through terminal board 32 and can provide a place to attach insulator 64. FIG. 2 simply illustrates just one of many possible designs of the feedthrough terminal. Terminal 36 includes two threaded portions 68 and 70. One threaded portion 68 is for attaching terminal 36 to board 32, and the other threaded portion 70 is for supporting insulator 64. Terminal 36 has a shoulder 72 that compresses O-ring 42 to ensure a hermetic seal. Terminal 36 also includes a post 74 for attaching line 66. Lead 50 can be attached to terminal 36 as shown.

Figure 3:
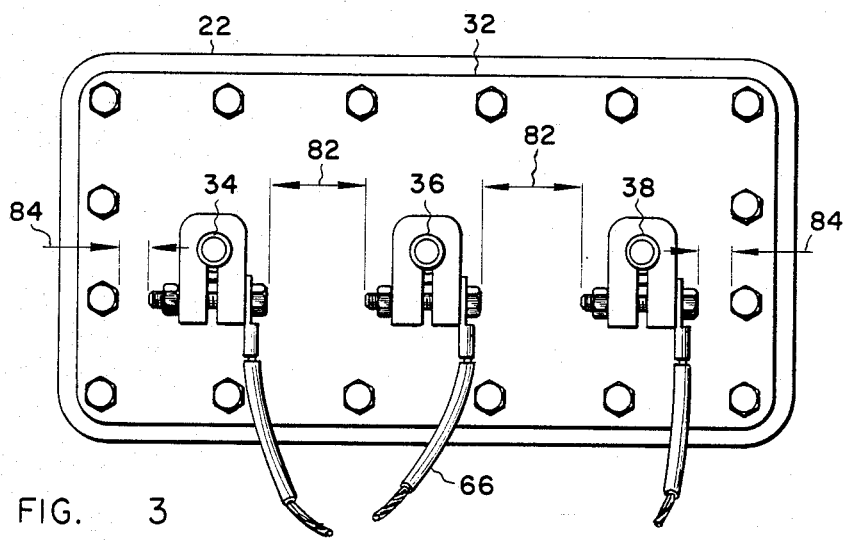
FIG. 3 is a front view of the terminal board shown in FIGS. 2 and 3.

Insulator 64 is of sufficient length 76 to position terminal 62 at an arc inhibiting distance from both the nearest terminal 36 and the motor housing 22. In the embodiment shown in FIG. 2, the surface distance 78 over insulator 64 between terminal 62 and 36 is at least 2½ inches, and the shortest distance 80 from terminal 62 to motor housing 22 is at least 2 inches. As a further protection against arcing, terminals 34, 36, and 38 are separted from each other by at least three inches 82 and mounted at least two inches 84 from motor housing 22, as shown in FIGS. 2 and 3.

With a low voltage hookup (less than 3,000 volts), leads 48 and 54 are tied to terminal 34, leads 50 and 56 are tied to terminal 36, and leads 52 and 58 are tied to terminal 38. In a low voltage application, insulator 64 is not used and thus can be eliminated.

Although the invention is described with respect to a Preferred embodiment, modifications thereto will be apparent to those skilled in the art. Therefore, the scope of the invention is to be determined by reference to the claims which follow.

I claim:

1. A refrigeration apparatus comprising:
   a three-phase motor disposed in a housing and coupled to a compressor, said housing being substantially filled with a refrigerant and hermetically sealed by a terminal board attached to said housing;
   a condenser, an expansion device, and an evaporator connected in series flow relationship with said compressor;
   three electrical feedthrough terminals extending through said terminal board to conduct electrical current to said motor;
   an electrical insulator disposed inside said housing and attached to one of said feedthrough terminals; and
   a fourth electrical terminal attached to said insulator and electrically connected to said motor.

2. The refrigeration apparatus as recited in claim 1, wherein said compressor is also disposed in said housing.

3. The refrigeration apparatus as recited in claim 1, wherein said refrigerant inside said housing is at a pressure of at least 10 PSIG.

4. The refrigeration apparatus as recited in claim 1, wherein said fourth terminal is electrically connected to said motor by way of three motor winding leads.

5. The refrigeration apparatus as recited in claim 1, wherein said one of said feedthrough terminals includes a shoulder between two threaded portions.

6. The refrigeration apparatus as recited in claim 5, wherein said feedthrough terminal having a shoulder also includes a post for connection to a line leading from a three-phase power source.

7. The refrigeration apparatus as recited in claim 5, further comprising a first seal in compression between said terminal board and said shoulder.

8. The refrigeration apparatus as recited in claim 1, further comprising a second seal between said terminal board and said housing.

9. The refrigeration apparatus as recited in claim 1, wherein said insulator is at least 2½ inches long.

10. The refrigeration apparatus as recited in claim 1, wherein said insulator is made of a phenolic material.

11. The refrigeration apparatus as recited in claim 1, wherein said insulator is threaded to said one of said feedthrough terminals.

12. The refrigeration apparatus as recited in claim 1, wherein said fourth terminal is spaced apart from each of said three feedthrough terminals by a surface distance of at least 2½ inches.

13. The refrigeration apparatus as recited in claim 1, wherein said fourth terminal is spaced apart from said housing by at least 2 inches.

14. The refrigeration apparatus as recited in claim 1, wherein said three terminals are spaced apart from each other by at least 3 inches and are spaced apart from said housing by at least 2 inches.

15. A refrigeration apparatus comprising:
   a three-phase electric motor coupled to a compressor both of which are disposed in a housing containing a refrigerant at a pressure of at least 10 PSIG;
   a condenser, an expansion device, and an evaporator connected in series flow relationship with said compressor;
   a substantially non-conductive terminal board hermetically fastened to said housing to seal in said refrigerant;
   three electrical feedthrough terminals extending through said terminal board to conduct electrical current to said motor;
   an electrical insulator disposed inside said housing and attached to one of said feedthrough terminals; and
   a fourth electrical terminal attached to said insulator and electrically connected to said motor by way of three motor winding leads.

16. The refrigeration apparatus as recited in claim 15, wherein said one of said feedthrough terminals includes a shoulder between two threaded portions.

17. The refrigeration apparatus as recited in claim 16, wherein said feedthrough terminal having a shoulder also includes a post for connection to a line leading from a three-phase power source.

18. The refrigeration apparatus as recited in claim 16, further comprising a first seal in compression between said terminal board and said shoulder.

19. The refrigeration apparatus as recited in claim 15, further comprising a second seal between said terminal board and said housing.

20. The refrigeration apparatus as recited in claim 15, wherein said insulator is at least 2½ inches long.

21. The refrigeration apparatus as recited in claim 15, wherein said insulator is made of a phenolic material.

22. The refrigeration apparatus as recited in claim 15, wherein said insulator is threaded to said one of said feedthrough terminals.

23. The refrigeration apparatus as recited in claim 15, wherein said fourth terminal is spaced apart from each of said three feedthrough terminals by a surface distance of at least 2½ inches.

24. The refrigeration apparatus as recited in claim 15, wherein said fourth terminal is spaced apart from said housing by at least 2 inches.

25. The refrigeration apparatus as recited in claim 15, wherein said three terminals are spaced apart from each other by at least three inches and are spaced apart from said housing by at least two inches.

26. A refrigeration apparatus comprising:
   a three-phase electric motor coupled to a compressor both of which are disposed in a housing containing a refrigerant at a pressure of at least 10 PSIG;
   a condenser, an expansion device, and an evaporator connected in series flow relationship with said compressor;
   a substantially non-conductive terminal board hermetically fastened to said housing to seal in said refrigerant;
   three electrical feedthrough terminals extending through said terminal board to conduct electrical current to said motor, said three terminals being spaced apart from each other by at least three inches and spaced apart from said housing by at least two inches;
   an electrical insulator disposed inside said housing and attached to one of said feedthrough terminals; and
   a fourth electrical terminal attached to said insulator and electrically connected to said motor by way of three motor winding leads, said fourth terminal being spaced apart from each of said three feedthrough terminals by a surface distance of at least 2½ inches and spaced apart from said housing by at least 2 inches.

27. The refrigeration apparatus as recited in claim 26, wherein said one of said feedthrough terminals includes a shoulder between two threaded portions.

28. The refrigeration apparatus as recited in claim 27, wherein said feedthrough terminal having a shoulder also includes a post for connection to a line leading from a three-phase power source.

29. The refrigeration apparatus as recited in claim 27, further comprising a first seal in compression between said terminal board and said shoulder.

30. The refrigeration apparatus as recited in claim 26, further comprising a second seal between said terminal board and said housing.

31. The refrigeration apparatus as recited in claim 26, wherein said insulator is at least 2½ inches long.

32. The refrigeration apparatus as recited in claim 26, wherein said insulator is made of a phenolic material.

33. The refrigeration apparatus as recited in claim 26, wherein said insulator is threaded to said one of said feedthrough terminals.

* * * * *

UNITED STATES PATENT AND TRADEMARK OFFICE
CERTIFICATE OF CORRECTION

PATENT NO. : 4,800,732

DATED : January 31, 1989

INVENTOR(S) : EARL W. NEWTON

It is certified that error appears in the above-identified patent and that said Letters Patent is hereby corrected as shown below:

In column 2, line 34, please change "1" to --10--.

In column 3, line 5, please change "Power to --power--.

In column 3, line 42, please change "Preferred" to --preferred--.

Signed and Sealed this

Eleventh Day of July, 1989

Attest:

DONALD J. QUIGG

*Attesting Officer*         *Commissioner of Patents and Trademarks*